(12) United States Patent
Green (10) Patent No.: US 8,140,131 B1
(45) Date of Patent: Mar. 20, 2012

(54) SYSTEMS AND METHODS FOR HOLDING MOBILE ELECTRONIC DEVICES

(76) Inventor: Leo Green, Rienzi, MS (US)

( * ) Notice: Subject to any disclaimer, the term of this patent is extended or adjusted under 35 U.S.C. 154(b) by 874 days.

(21) Appl. No.: 12/140,082

(22) Filed: Jun. 16, 2008

(51) Int. Cl.
*H04M 1/00* (2006.01)

(52) U.S. Cl. ............... 455/575.1; 455/575.6; 455/90.1; 455/550.1; 455/90.3; 379/433.1; 379/433.02; 368/10

(58) Field of Classification Search ............ 455/575.1, 455/575.6, 90.1, 550.1, 90.3; 379/433.1, 379/433.02; 368/10
See application file for complete search history.

(56) References Cited

U.S. PATENT DOCUMENTS

| | | | | |
|---|---|---|---|---|
| 5,008,864 A | * | 4/1991 | Yoshitake | 368/10 |
| 5,274,613 A | * | 12/1993 | Seager | 368/13 |
| 5,657,201 A | * | 8/1997 | Kochis | 361/679.41 |
| D404,908 S | | 2/1999 | Lollis | |
| 6,651,854 B1 | | 11/2003 | LaCoste | |
| 6,757,390 B2 | * | 6/2004 | Ito et al. | 379/433.1 |
| 6,796,467 B2 | | 9/2004 | Caldana | |
| D527,893 S | | 9/2006 | Martz | |
| D545,564 S | | 7/2007 | Davis | |
| 7,243,824 B2 | | 7/2007 | Tabata | |
| D548,457 S | | 8/2007 | Reinerio | |
| D555,353 S | | 11/2007 | Kennedy | |
| 7,529,155 B2 | * | 5/2009 | Fasciano | 368/10 |
| 7,618,260 B2 | * | 11/2009 | Daniel et al. | 439/37 |
| 2003/0164389 A1 | * | 9/2003 | Byers | 224/221 |
| 2006/0166720 A1 | * | 7/2006 | Dixon | 455/575.6 |

* cited by examiner

*Primary Examiner* — Sanh Phu
(74) *Attorney, Agent, or Firm* — Thomas, Kayden, Horstmeyer & Risley, LLP.

(57) ABSTRACT

Systems and methods for holding mobile electronic devices are provided. In one embodiment, a system includes a wristband that can be worn by a mobile electronic device user and a clip that can be removably connected to a mobile electronic device and used to removably connect the mobile electronic device to the wristband. An exemplary embodiment of a method includes the steps of connecting a clip to a mobile electronic device and removably connecting the clip to a wristband that can be worn by a user of the mobile electronic device.

17 Claims, 8 Drawing Sheets

SYSTEMS AND METHODS FOR HOLDING MOBILE ELECTRONIC DEVICES

BACKGROUND

1. Technical Field

This disclosure generally relates to systems and methods for holding mobile electronic devices.

2. Description of the Related Art

Mobile electronic devices, such as portable music players, video players, personal digital assistants (PDAs), and cellular phones are common; many people own at least one mobile electronic device. A user of such a mobile electronic device may desire a convenient way to carry the device, so that the device is easily reachable when needed.

SUMMARY

Systems and methods for holding mobile electronic devices are provided. In one exemplary embodiment, a system includes a wristband that can be worn by a mobile electronic device user and a clip that can be connected to a mobile electronic device and used to removably connect the mobile electronic device to the wristband. An exemplary embodiment of a method of the present invention includes the steps of connecting a clip to a mobile electronic device and removably connecting the clip to a wristband that can be worn by a user of the mobile electronic device.

Other systems, methods, features, and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Figure 1A:
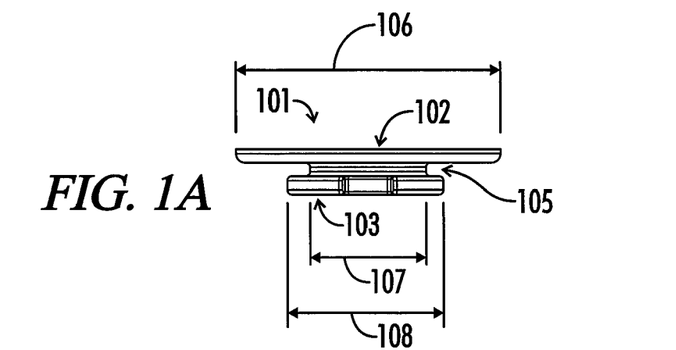
FIG. 1A is a side view of an embodiment of a clip for holding a mobile electronic device.
Figure 1B:
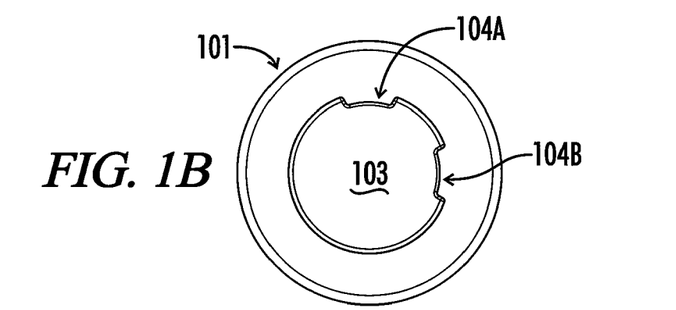
FIG. 1B is a top view of the clip shown in FIG. 1A.

Systems and methods for holding a mobile electronic device are provided. One exemplary embodiment of a system includes a wristband that can be worn by a mobile electronic device user and a clip that can be connected to a mobile electronic device and used to removably connect the mobile electronic device to the wristband. An exemplary embodiment of a clip (clip 101) that can be used to hold a mobile electronic device is shown in FIGS. 1A and 1B. Clip 101 may include a disc shaped (or circular) upper portion 102 connected to a disc shaped (or circular) lower portion 103 using neck portion 105. Upper portion 102 may have a diameter 106 (also referred to as upper portion diameter 106) that is greater than the diameter of neck portion 105 (neck diameter 107) and lower portion 103 (lower portion diameter 108). As shown in FIG. 1B, lower portion 103 may include at least two notches, 104A and 104B (also referred to as indentions 104A and 104B), which can be used to hold clip 101 in at least two different positions.

Figure 2:
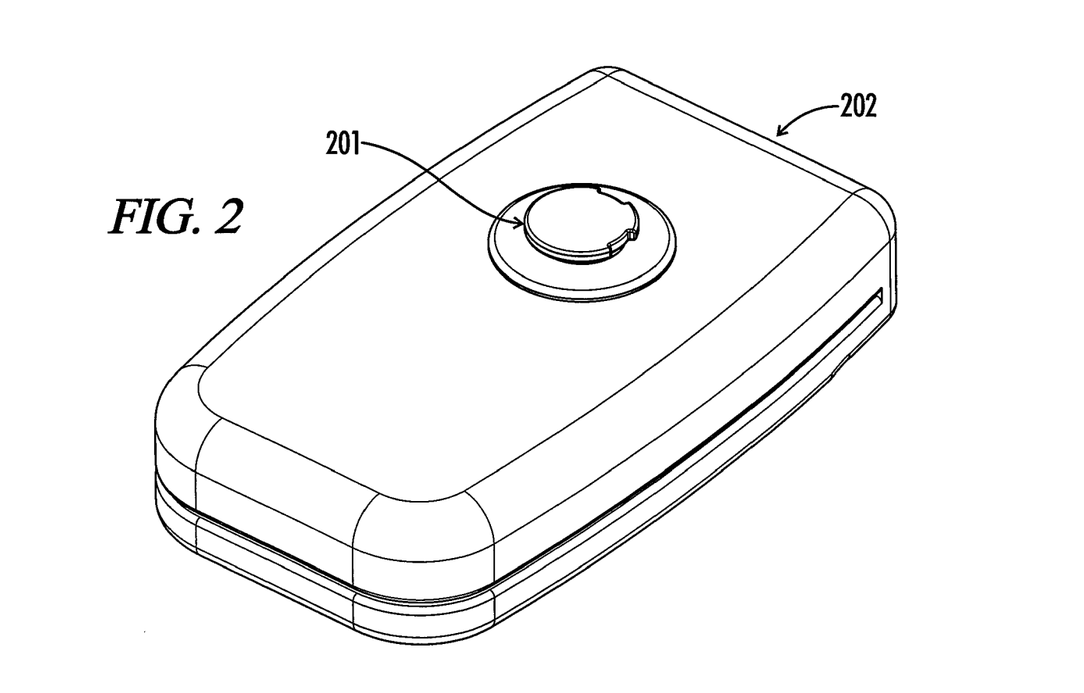
FIG. 2 is a perspective view of the clip shown in FIGS. 1A and 1B attached to a mobile electronic device.

FIG. 2 shows a mobile electronic device 202 with an attached clip 201. Clip 201 is identical to clip 101 shown in FIGS. 1A and 1B and may be attached to mobile electronic device 202 using an adhesive material (not shown) that covers at least a portion of upper portion 102. Any appropriate adhesive material may be used. Clip 201 may be attached to any type of mobile electronic device, including, but not limited to, portable music players, video players, personal digital assistants (PDAs), and cellular phones.

Figure 3:
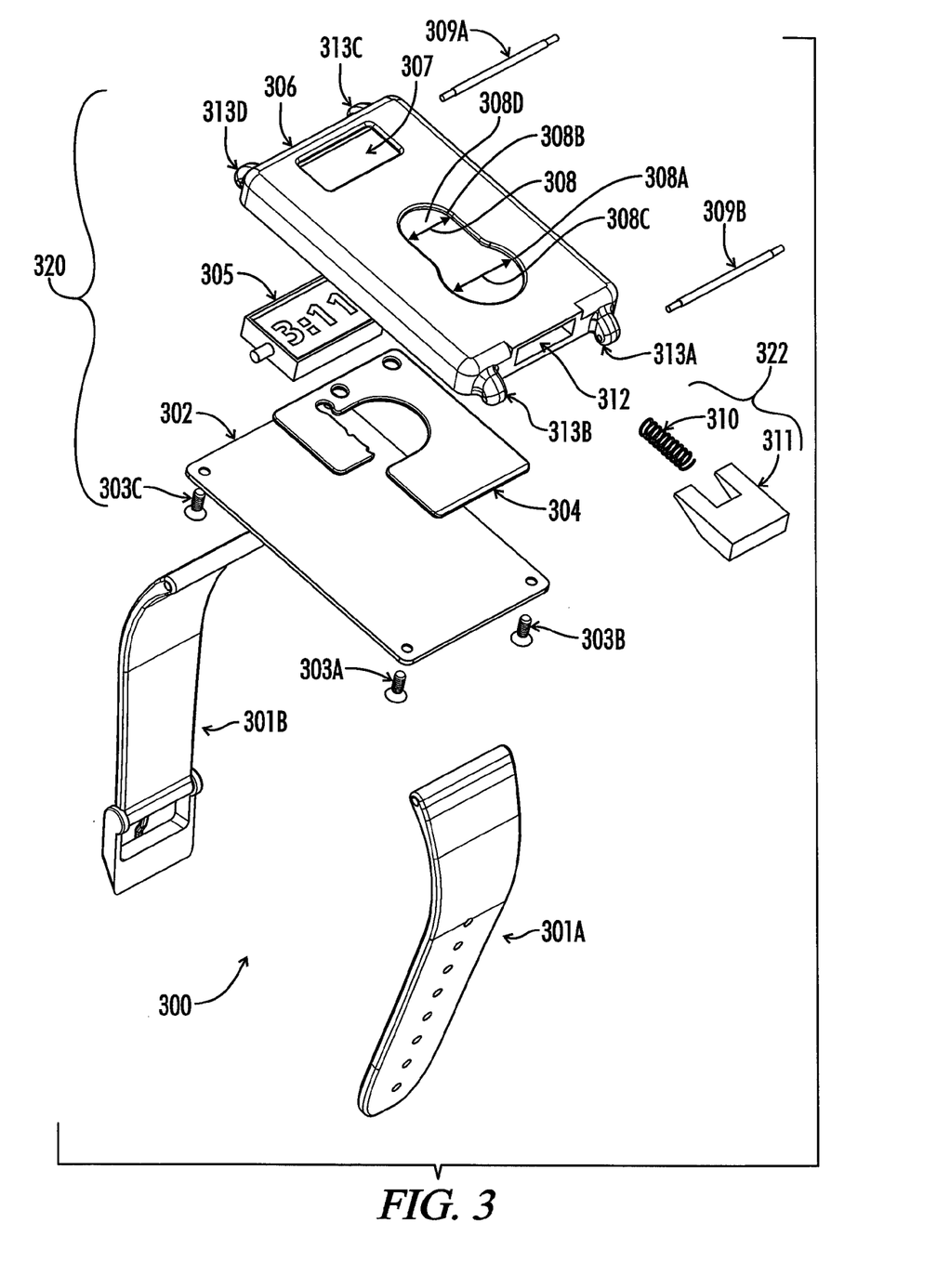
FIG. 3 is an exploded view of an embodiment of a wristband.

FIG. 3 shows an exploded view of a wristband 300. Wristband 300 may include straps 301A and 301B and a main body 320. Straps 301A and 301B may be attached to bars 309A and B; bars 309A-B, in turn, may be inserted into holes 313A-D to secure straps 301A and B to a top portion 306 of main body 320. A bottom plate 302 may be attached to top portion 306 using screws 303A-D. Between bottom plate 302 and top portion 306 are clip holder 304 and clock 305. Top portion 306 includes openings 307 and 308. Opening 307 corresponds to clock 305, while opening 308 corresponds to clip holder 304. Opening 308, which is keyhole shaped in one embodiment, includes a wide portion 308A and a narrow portion 308B. Wide portion 308A has a wide portion width 308C that is substantially the same as lower portion diameter 108 of clip 101 and narrow portion 308B has a narrow portion width 308D that is substantially the same as neck diameter 107 of clip 101. Spring 310 and holding/release button 311 (spring 310 and holding/release button 311 are referred to collectively as a spring biased button assembly 322) are inserted into slot 312 in top portion 306, and holding/release button 311 engages with clip holder 304.

Figure 4A:
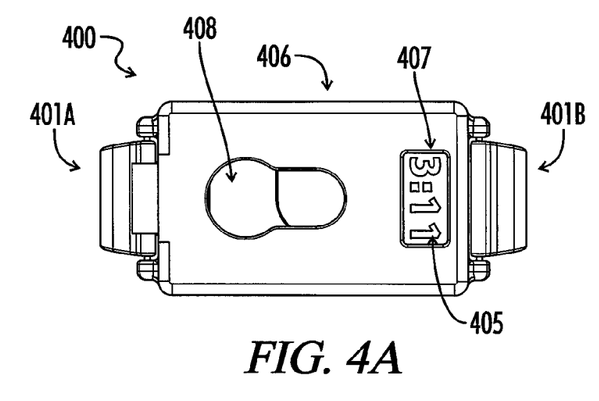
FIG. 4A is a top view of the wristband shown in FIG. 3.
Figure 4B:
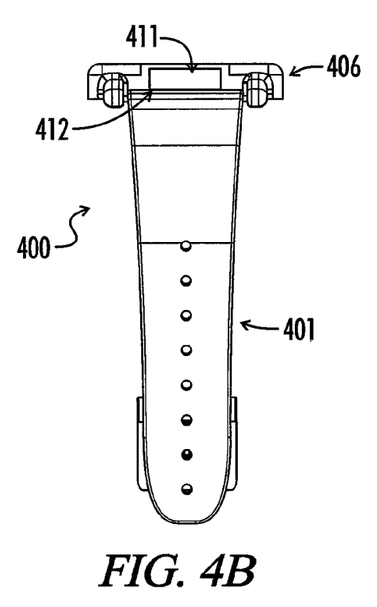
FIG. 4B is a side view of the wristband shown in FIG. 3.
Figure 4C:
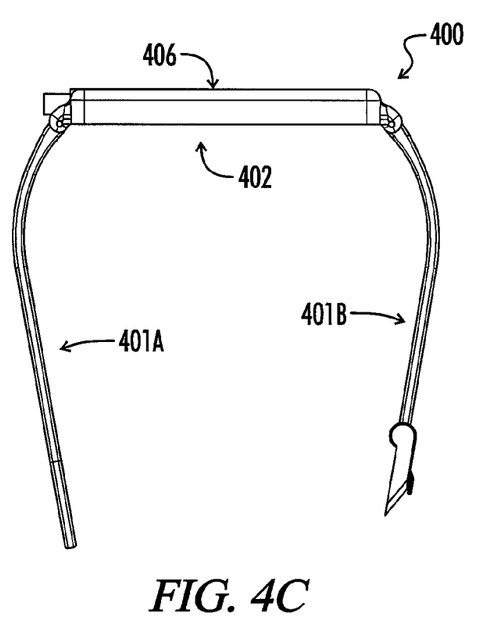
FIG. 4C is a side view of the wristband shown in FIG. 3 rotated 90 degrees.

FIG. 4A shows a top view of a wristband 400 (referred to as wristband 300 in FIG. 3). Top portion 406 includes openings 407 and 408. Clock 405 is visible through opening 407. FIGS. 4B-C show side views of wristband 400. Top portion 406 is attached to bottom plate 402, with straps 401A-B attached to the top portion 406. Release button 411 protrudes through opening 412 in top portion 406.

Figure 5:
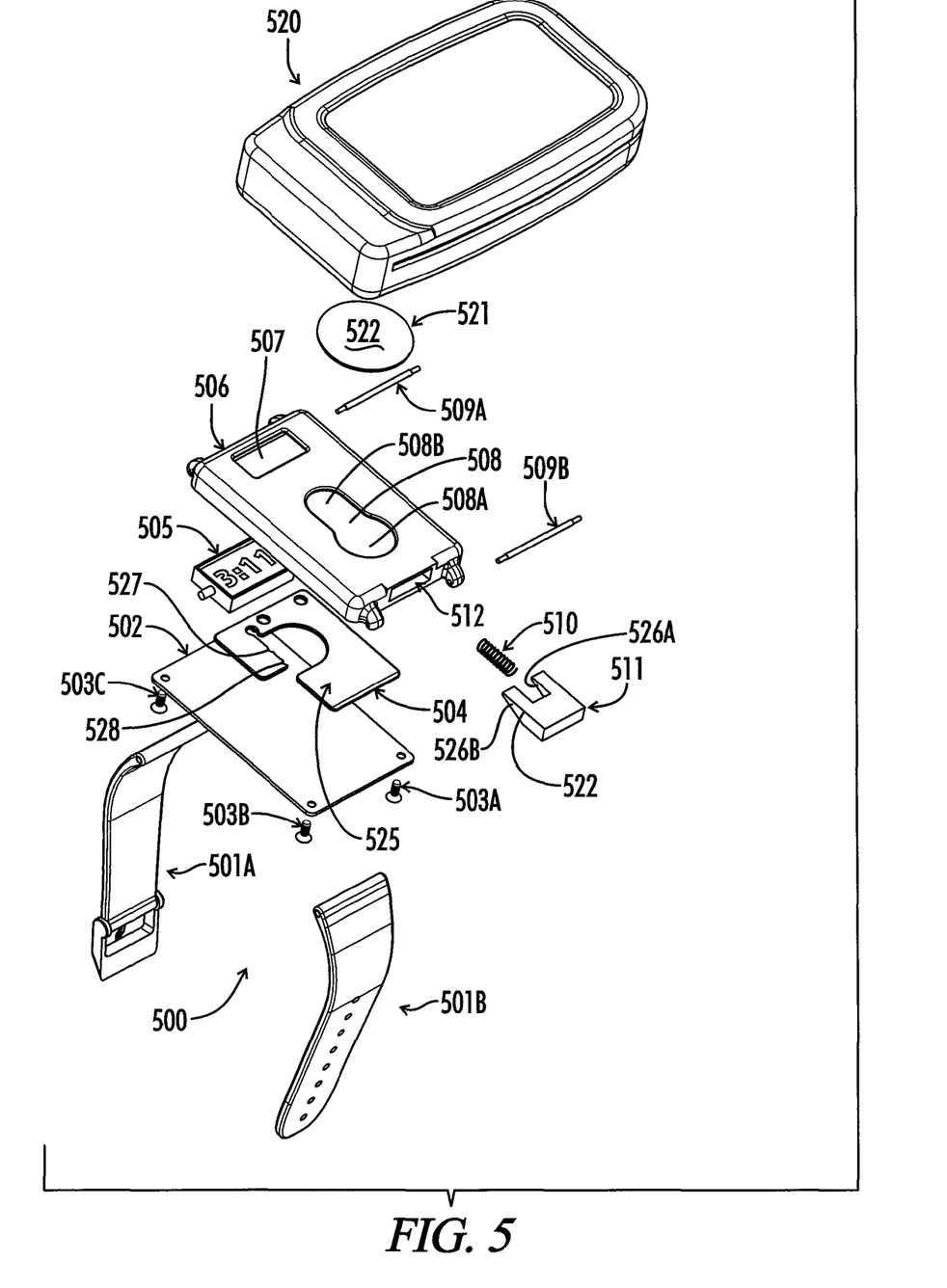
FIG. 5 is an exploded view of the wristband shown in FIG. 3 with a clip and a mobile electronic device.

FIG. 5 shows an exploded view of an embodiment of a wrist band 500 with a mobile electronic device 520 and clip 521. The mobile electronic device 520 may be attached with an adhesive to upper portion 522 of clip 521. Any appropriate adhesive may be used. Spring 510 and holding/release button 511 are inserted into opening 512 in top portion 506, and holding/release button 511 engages with clip holder 504. When holding/release button 511 is pressed by a user (moving spring biased button assembly 522 from a clip holding position to a clip insertion position), sloped portions 526A-B of holding/release button 511 move clip holder portion 525 downward and away from opening 508. This allows the lower portion of clip 521 (not shown in FIG. 5 but identical to lower portion 103 shown in FIG. 1A) to be inserted into wide portion 508A and slid into narrow portion 508B. When holding/release button 511 is released by the user, clip holder portion 525 moves back into its original position and prevents clip 521 from sliding back into wide portion 508A. In some embodiments, clip holder 504, using notch tabs 527 and 528, may hold clip 521 in one of two positions that are approximately 90 degrees offset from one another by engaging with indentations in the lower portion of clip 521 (not shown in FIG. 5 but identical to indentions 104A-B shown in FIG. 1B); mobile electronic device 520 may be moved from a first position to a second position by turning the mobile electronic device 520. Clip 521 may be removed from and reinserted into opening 508 as desired by the user. To remove clip 521 from wristband 500, the user may press holding/release button 511 to cause spring 510 and clip holder 504 to release clip 521 via wide portion 508A of opening 508, separating the mobile electronic device 520 from wristband 500.

Figure 6A:
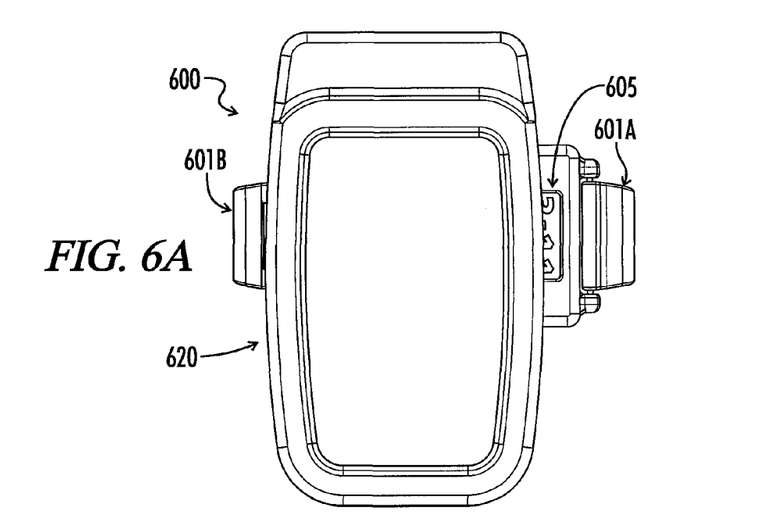
FIG. 6A is a top view of the wristband and mobile electronic device shown in FIG. 5.
Figure 6B:
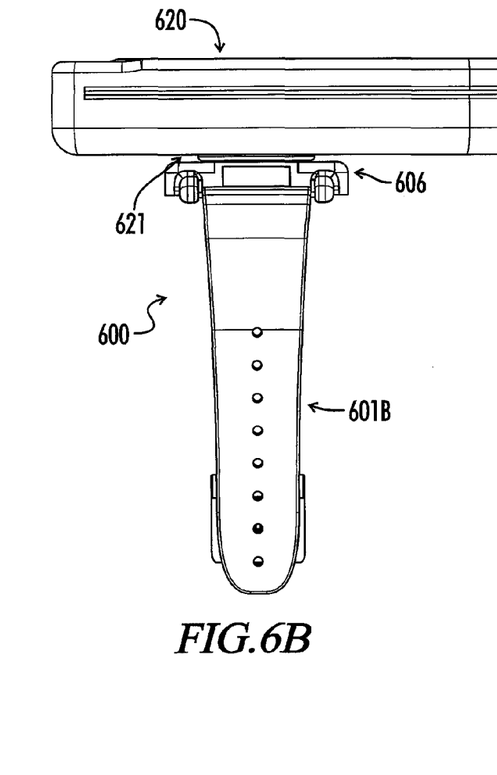
FIG. 6B is a side view of the wristband and mobile electronic device shown in FIG. 6A.
Figure 6C:
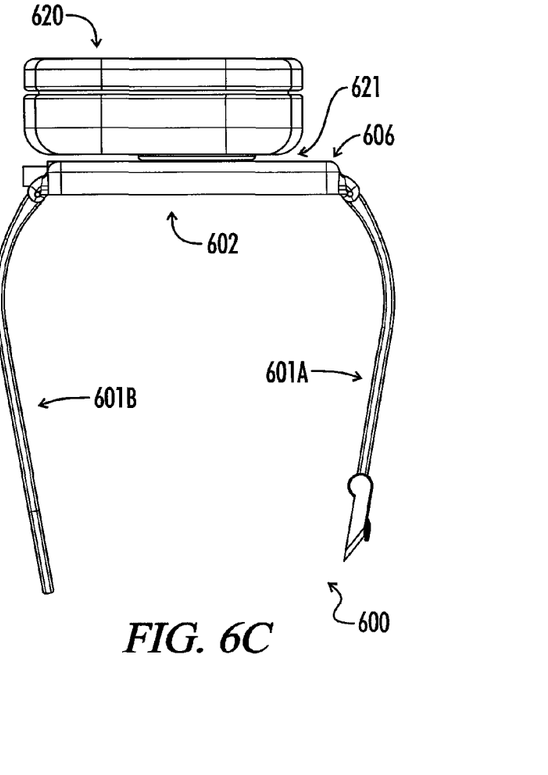
FIG. 6C is a side view of the wristband and mobile electronic device shown in FIG. 6A rotated 90 degrees.

FIGS. 6A-C shows embodiments of a wristband 600 with a mobile electronic device 620 (wristband 600 and mobile electronic device 620 are identical to wristband 500 and mobile electronic device 520 shown in FIG. 5). In some embodiments, mobile electronic device 620 may rotate 90 degrees about a central axis of clip 621, allowing the user to select a comfortable position for viewing and using the mobile electronic device, and also allowing the user to view clock 605.

Figure 7:
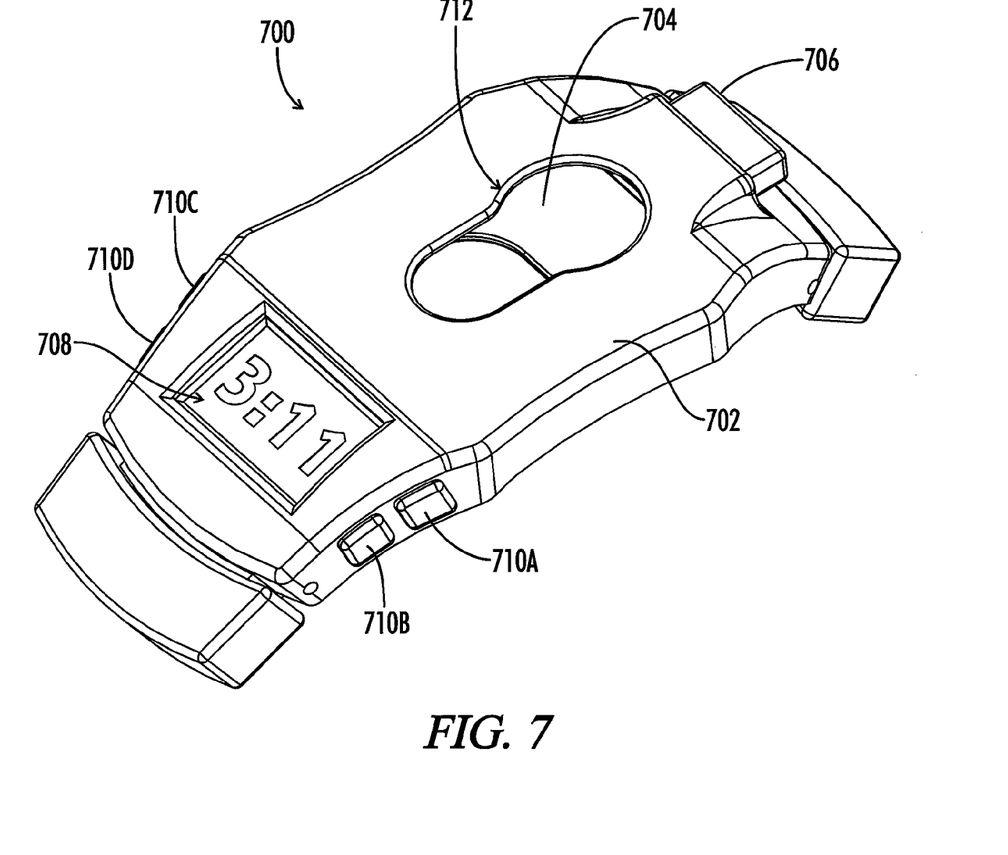
FIG. 7 is a perspective view of the main body of a second embodiment of a wristband for holding a mobile electronic device.

Another embodiment of a main body 700 is shown in FIG. 7. Main body 700 includes a top portion 702, a clip holder 704, a holding/release button 706, a clock 708, and clock control buttons 710A-D. Main body 700 includes an opening 712, which is designed receive and hold a clip, such as the one shown in FIGS. 1A and 1B and discussed above. Clock control buttons 710A-D are used to control the time, date and light functions of the clock in a conventional manner well known in the art.

Figure 8:
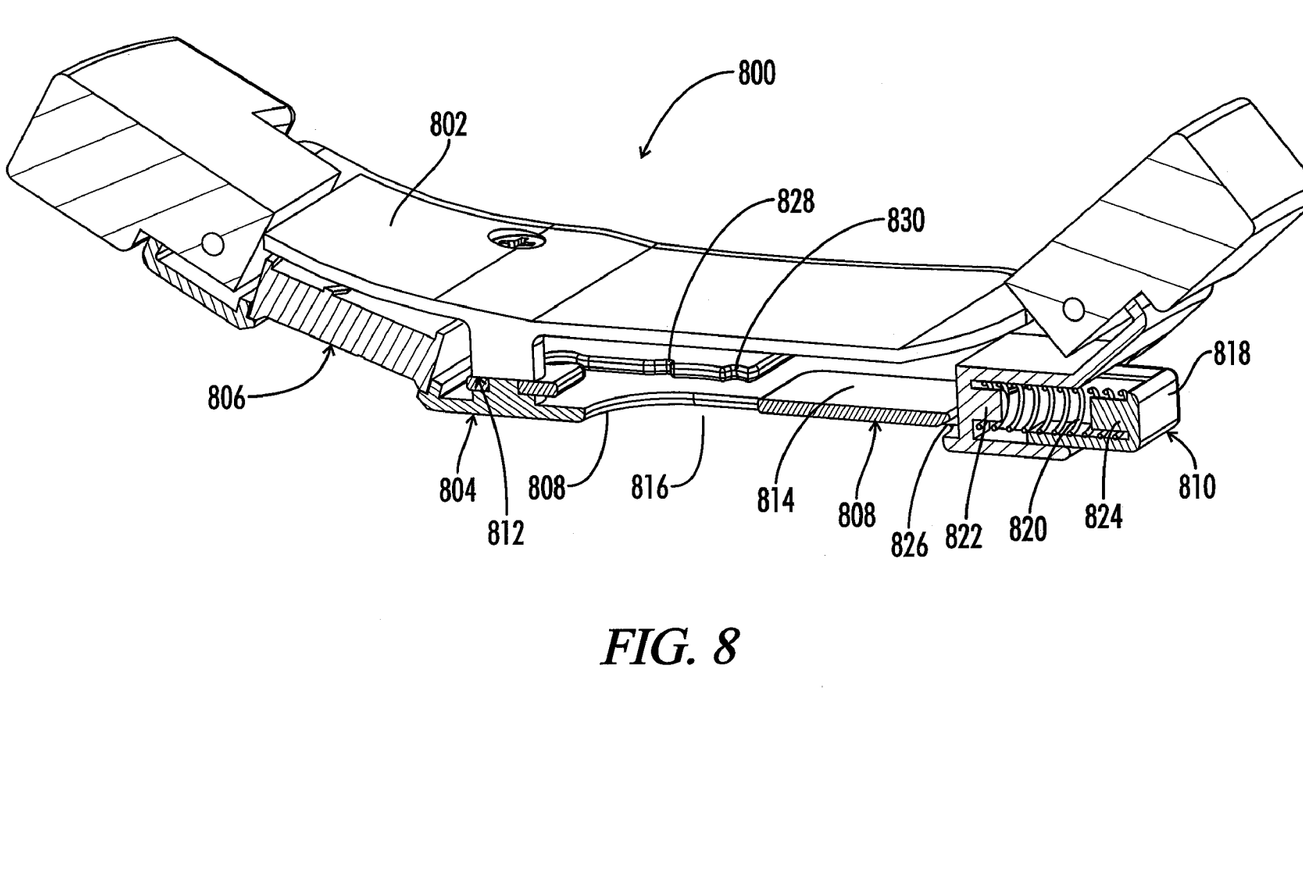
FIG. 8 is a cut away view of the main body shown in FIG. 7.

A cut away view of another embodiment of a main body 800 is shown in FIG. 8. Main body 800 includes a back plate 802, a top portion 804, a clock 806, a clip holder 808, and a spring biased wedge shaped button 810. Clip holder 808 has a fixed end 812, which is sandwiched between top portion 804 and back plate 802 and remains relatively fixed with respect to main body 800, and a movable portion 814, which can be moved downward and away from opening 816 defined in top portion 804 when spring biased wedge shaped button 810 is pressed by a user. Clip holder 808 also includes notch tabs 828 and 830 for holding a clip in one of two positions using notches defined in the clip. Spring biased wedge shaped button 810 includes a button 818 and a spring 820. Top portion 804 includes a top portion spring support post 822 and button 818 includes a button spring support post 824. Posts 822 and 824 are disposed within opposite ends of spring 820. When spring biased wedge shaped button 810 is pressed by a user, button 818, and, more specifically, sloped portion 826 slides forward and causes movable portion 814 to move away from opening 816. This allows a clip, such as the one shown in FIGS. 1A and 1B, to be inserted into opening 816. When spring biased wedge shaped button 810 is released, sloped portion 826 slides backward and allows movable portion 814 to move toward opening 816. This holds any clip that has been inserted into opening 816 in place.

Figure 9:
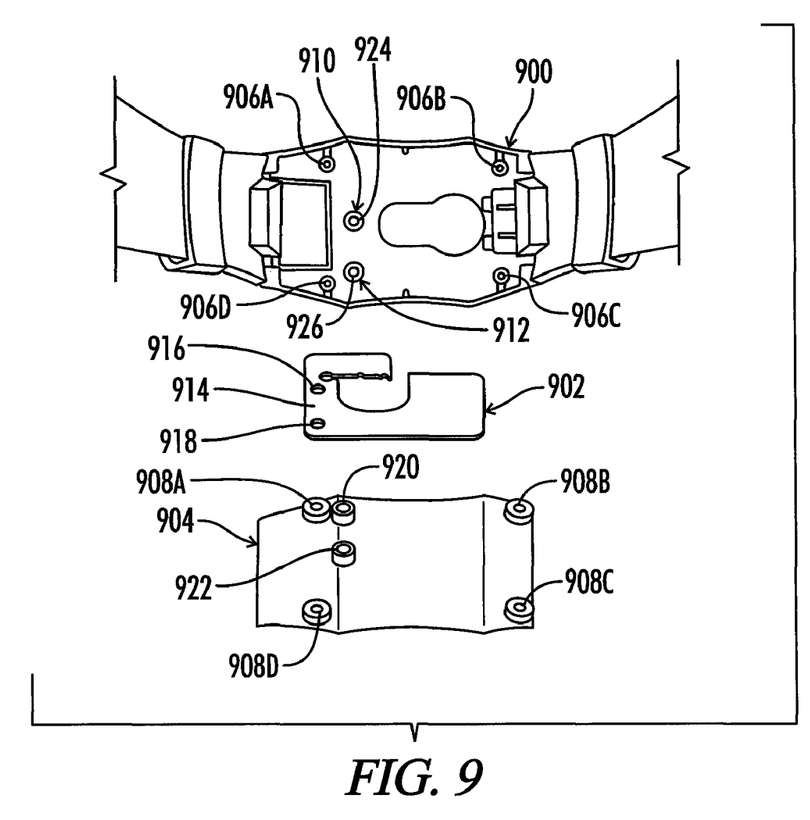
FIG. 9 is an exploded view of the main body shown in FIG. 7.

FIG. 9 shows exemplary embodiments of a top portion 900, a clip holder 902, and a back plate 904. Top portion 900 includes four threaded openings 906A-D, which are used to attached top portion 900 to back plate 904 using screws and screw openings 908A-D defined in back plate 904. Top portion 900 also includes two clip holder support posts, 910 and 912 (or simply top portion posts 910 and 912), which are designed to be partially inserted through clip holder openings 916 and 918 (or post openings 916 and 918) into engagement with back plate posts 920 and 922, thereby holding fixed portion 914 of clip holder 902 in place with respect to top portion 900 and back plate 904. More specifically, tips 924 and 926 pass through clip holder openings 916 and 918 into engagement with back plate posts 920 and 922.

Figure 10:
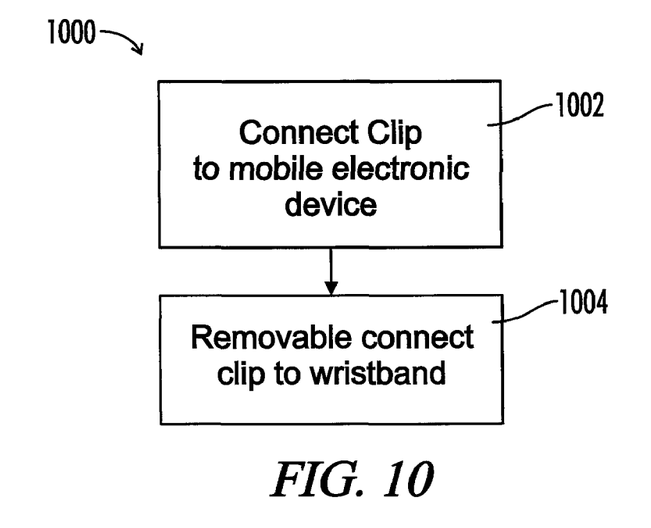
FIG. 10 is a flow chart showing one embodiment of a method for holding a mobile electronic device.

An exemplary embodiment of a method 1000 for holding a mobile electronic device is shown in FIG. 10. Method 1000 includes the steps of connecting a clip to a mobile electronic device (step 1002) and removably connecting the clip to a wristband (step 1004). Method 1000 may include the steps of applying an adhesive to a connecting portion of the clip to create an adhesive covered connecting clip portion and pressing this portion of the clip to an outer surface of the mobile electronic device. The removably connecting step may include the steps of pressing a spring biased button included with the wristband, which causes a clip holder in the wristband to move from a clip locking position to a clip receiving position, inserting the clip into an opening defined in the wristband, and releasing the spring biased button, which causes the clip holder to move from the clip receiving position to the clip locking position. The removably connecting step may also include the step of sliding the clip from the clip insertion position to a clip holding position prior to releasing the spring biased button. The removably connecting step may further include the step of rotating the clip from a first mobile electronic device holding position to a second mobile electronic device holding position. Rotating the clip in this manner causes a notched portion of the clip to engage with a tab portion of the clip holder and hold the mobile electronic device in the second mobile electronic device holding position.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A system for holding a mobile electronic device, comprising:
    a wristband that can be worn by a mobile electronic device user; and
    a clip that can be connected to a mobile electronic device and used to connect the mobile electronic device to the wristband, wherein:
    the wristband comprises a pair of straps connected to a main body; and
    the main body comprises a top portion comprising a clip opening, a clip holder adjustably connected to the main body using a spring biased button assembly and positioned in the main body so that the clip can be inserted into the clip opening when the spring biased button assembly is in a clip insertion position and held in place by the clip holder when the spring biased button assembly is in a clip holding position, and a back plate connected to the top portion so that the clip holder and spring assembly are positioned in an interior portion of the main body.

2. The system of claim 1, wherein:
the main body further comprises a clock opening; and
the system further comprises a clock comprising a clock face positioned in the main body so that the clock face may be viewed through the clock opening.

3. The system of claim 1, wherein the clip holder includes a fixed end, which remains substantially fixed with respect to the main body, and a movable end, which may be moved with respect to the main body by the spring assembly to allow insertion and removal of the clip.

4. The system of claim 1, wherein the clip comprises:
a disc shaped upper portion; and
a disc shaped lower portion connected to the disc shaped upper portion using a neck portion.

5. The system of claim 4, wherein:
the disc shaped upper portion comprises an upper portion diameter, the disc shaped lower portion comprises a lower portion diameter, and the neck portion comprises a neck diameter;
the lower portion diameter is smaller than the upper portion diameter; and
the neck diameter is smaller than the lower portion diameter.

6. The system of claim 4, wherein:
the disc shaped lower portion comprises at least two notches that can be used to hold the clip in at least two different positions with respect to the wristband; and
the wristband comprises a clip holder comprising a clip holding portion that can be engaged with either of the at least two notches, thereby holding the clip in either of the at least two different positions.

7. The system of claim 1, wherein the clip is connected to the mobile electronic device using adhesive.

8. A mobile electronic device holding system, comprising:
a clip;
means for connecting the clip to a mobile electronic device;
a wristband; and
wherein the clip and wristband comprise means for adjustably connecting the clip to the wristband;
wherein the wristband comprises:
a main body, the main body comprising a top portion, a clip holder, and a back plate, the top portion comprising a clip opening, a clock opening, means for fixing a first end of the clip holder in place with respect to the top portion and back plate and means for moving a second end of the clip holder with respect to the top portion and back plate; and
a clock positioned in the main body and aligned with the clock opening so that the clock may be viewed by a mobile electronic device user.

9. The system of claim 8, wherein the clip comprises:
a circular flat upper portion; and
a circular flat lower portion connected to the circular flat upper portion using a circular neck portion.

10. The system of claim 8, wherein the means for connecting the clip to a mobile electronic device comprises an adhesive.

11. The system of claim 8, wherein the:
means for fixing the first end of the clip holder in place comprises a pair of top portion posts defined on an inner surface of the top portion, a pair of post openings defined in the clip holder, and a pair of back plate posts defined on an inner surface of the back plate, the top portion posts comprising tips passing through the post openings defined in the clip holder into contact with the back plate posts; and means for moving the second end of the clip holder comprises a spring biased wedge shaped button that can be pressed by the mobile electronic device user and moved with respect to the clip holder, the spring biased wedge shaped button comprising a sloped portion that causes the clip holder to move from a clip locking position to a clip insertion position when pressed by the mobile electronic device user and to move from the clip insertion position to the clip locking position when released by the mobile electronic device user.

12. The system of claim 8, wherein the means for adjustably connecting the clip to the wristband comprises first and second notches defined in the clip and a notch tab defined in the clip holder, the notch tab engaging the first notch when the clip is positioned in a first position and engaging the second notch when the clip is positioned in a second position.

13. A method for holding a mobile electronic device, comprising the steps of:
connecting a clip to a mobile electronic device; and
removably connecting the clip to a wristband that can be worn by a user of the mobile electronic device;
wherein the removably connecting step comprises the steps of:
pressing a spring biased button included with the wristband thereby causing a clip holder included in the wristband to move from a clip locking position to a clip receiving position;
inserting the clip into an opening defined in the wristband;
releasing the spring biased button thereby causing the clip holder to move from the clip receiving position to the clip locking position.

14. The method of claim 13, wherein the connecting step comprises the steps of:
applying an adhesive to a connecting portion of the clip to create an adhesive covered connecting clip portion; and
pressing the adhesive covered connecting clip portion to an outer surface of the electronic mobile device.

15. The method of claim 13, wherein the removably connecting step further comprises the step of sliding the clip from a clip insertion position to a clip holding position prior to releasing the spring biased button.

16. The method of claim 13, wherein the removably connecting step still further comprises the step of rotating the clip from a first mobile electronic device holding position to a second mobile electronic device holding position thereby causing a notched portion of the clip to engage with a tab portion of the clip holder and hold the mobile electronic device in the second mobile electronic device holding position.

17. A system for holding a mobile electronic device, comprising:
a wristband that can be worn by a mobile electronic device user; and
a clip that can be connected to a mobile electronic device and used to connect the mobile electronic device to the wristband;
wherein:
the clip comprises a disc shaped upper portion and a disc shaped lower portion connected to the disc shaped upper portion using a neck portion;
the disc shaped lower portion comprises at least two notches that can be used to hold the clip in at least two different positions with respect to the wristband; and
the wristband comprises a clip holder comprising a clip holding portion that can be engaged with either of the at least two notches, thereby holding the clip in either of the at least two different positions.

* * * * *